United States Patent [19]

Jannson et al.

[11] Patent Number: 4,898,450
[45] Date of Patent: Feb. 6, 1990

[54] EXPANDED BEAM NON-IMAGING FIBER OPTIC CONNECTOR

[75] Inventors: Tommasz Jannson; Joanna Jannson; Peter Yeung, all of Redondo Beach, Calif.

[73] Assignee: Physical Optics Corporation, Torrance, Calif.

[21] Appl. No.: 91,520

[22] Filed: Aug. 31, 1987

[51] Int. Cl.$^4$ .............................................. G02B 6/38
[52] U.S. Cl. ............................. 350/96.21; 350/96.15; 350/96.18
[58] Field of Search ............... 350/96.18, 96.20, 96.21, 350/96.22, 96.10, 96.15

[56] References Cited

U.S. PATENT DOCUMENTS

| | | | |
|---|---|---|---|
| 3,779,628 | 12/1973 | Kapron et al. | 350/96.15 |
| 3,963,327 | 6/1976 | Poirier | 350/96.10 X |
| 4,102,559 | 7/1978 | Hunzinger | 350/96.18 |
| 4,105,332 | 8/1978 | Hohne et al. | 350/96.15 X |
| 4,240,692 | 12/1980 | Winston | 350/96.10 |
| 4,441,783 | 4/1984 | Houghton et al. | 350/96.10 |
| 4,496,211 | 1/1985 | Daniel | 350/96.20 |
| 4,697,867 | 10/1987 | Blanc et al. | 350/96.10 |

Primary Examiner—John D. Lee
Attorney, Agent, or Firm—Lyon & Lyon

[57] ABSTRACT

There is disclosed an expanded beam fiber to fiber connector, based on non-imaging optic principles for coupling light beams from one optical fiber to another. The system consists of two identical connector parts, referred to herein as a collimating part and a concentrating part, each having a preferred partially curved reflective boundary surface for minimizing power loss and surrounding either a hollow space or a space filled with a uniform transparent medium. In one embodiment the boundary is metallic while in a second embodiment the boundary is in the form of an interface allowing total internal reflection. In both the hollow and filled case a lens may be located at the expanded end of both the collimater part and the concentrator part forming the connector. The connector is preferably located in a housing in order to protect and preserve the mechanical stability of the coupler.

23 Claims, 4 Drawing Sheets

EXPANDED BEAM NON-IMAGING FIBER OPTIC CONNECTOR

BACKGROUND OF THE INVENTION

This invention was made with Government support under Contract No. DE-AC03-86ER80423 awarded by the Department of Energy. The Government has certain rights in this invention.

The present invention relates generally to light transmission through optical fibers either in a single mode or in a multi-mode, and more particularly to coupling devices transmitting light beams from one optical fiber to another optical fiber.

In expanded beam connectors the coupling of light transmitted between input and output optical fibers requires two identical parts with the first coupling part connected to the input optical fiber and working as a collimator for expanding and simultaneously collimating a light beam while the second coupling part works as a concentrator for collecting the light beam from an expanded part and concentrating the light beam for feeding the output optical fiber.

The coupling parts have internally reflective side walls of axial-rotational symmetry that have optimized contours for obtaining the maximum transmission or coupling efficiency for minimizing the insertion optical coupling losses.

A coupling connector between optical fibers may be hollow in which case the internal reflective walls may be metallic and include focusing lenses at the coupling junction. In some cases the coupling members defined as the collimator part and the concentrator part are fully filled with a highly transmissive refractive material terminating in a spheric or aspheric focusing surface. The optimization of such coupling members is more fully described in Winston U.S. Pat. Nos. 3,923,281, 4,114,592, 4,003,638, and 4,237,332 and in an article entitled, Dielectric Totally Internally Reflecting Concentrators by Ning, Winston and O'Gallagher published in Applied Optics, Vol. 26, No. 2 under date of January 1987, and in a book entitled The Optics of Nonimaging Concentrators, Light and Solar Energy, by W. T. Welford and R. Winston published by the Academic Press in 1978 and hereinafter referred to as the Book. In general, the fundamentals of fiber optic non-imaging coupling are based on the Liouville theorem described in the cited book as well as in an article entitled Liouville's Theorem and Concentrator Optics, by Jannson and Winston published in the Journal of the Optical Society of America, Vol. A3, p. 1, under the date of January 1986.

The prior art analysis taught by Winston is restricted to the use of either a non-imaging concentrator or to the use of a non-imaging collimator but never to a connector or junction comprising both a collimator and a concentrator as is now described in the present patent application.

Some prior art devices are based exclusively on refractive optics with imaging optical elements that are either spheric as taught by GTE, aspheric as taught by GTE and Lambdek or of the graded index type called SELFOC. These devices all suffer from aberrations that are typical for imaging systems. It is possible to minimize the aberrations by aspheric geometry techniques, with the resulting trade-off being that the angular misalignment tolerance is significantly decreased.

Other prior art devices based on light reflection from side walls are cone couplers whose profile varies gradually in a straight line to form a cone.

SUMMARY OF THE INVENTION

In the present application there is described an expanded beam fiber optic connector having a pair of identical parts comprising a collimator part and a concentrator part for single mode or multi-mode operation. The collimator part expands and collimates the light beam from the input fiber and the concentrator part concentrates and collects the light beam to the output fiber. Each element has axial rotational symmetry and contains an internal reflective side wall having a partially curved shape of predetermined construction for minimizing optical power loss. The side wall is an internally reflective surface optimized on the basis of Liouville non-imaging optics in general, and on the time reversal principle, in particular.

Further objects and advantages of the invention will be made more apparent by referring now to the accompanying drawings wherein.

Figure 1:
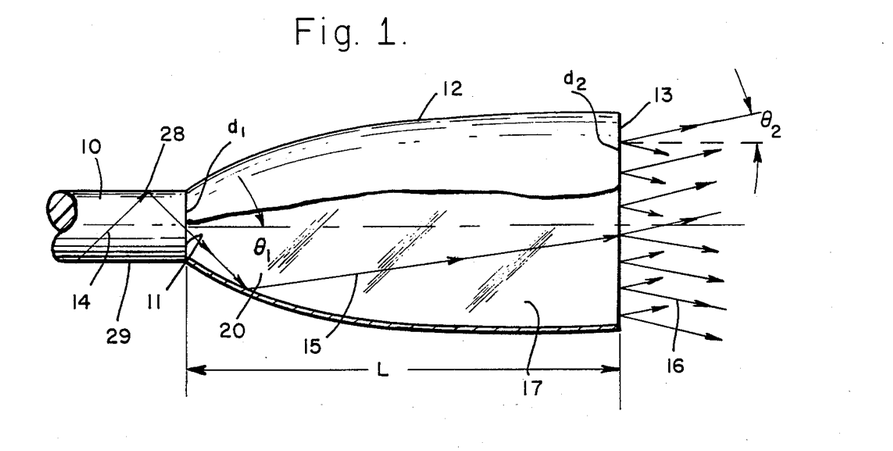
FIG. 1 illustrates a fiber optic collimator part forming one part of a fiber optic connector using the Liouville Non-Imaging Optics (LNIO) approach.
Figure 2:
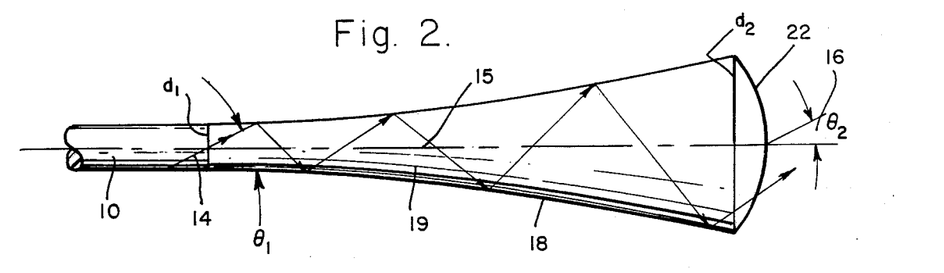
FIG. 2 illustrates another embodiment of a fiber optic collimator part having a converging refractive lens element at the expanded end portion.
Figure 3:
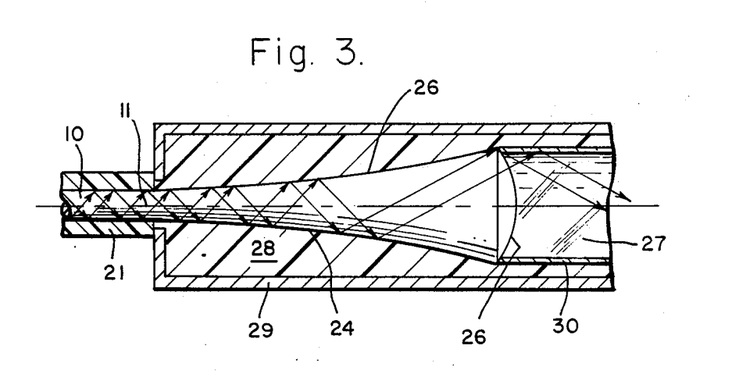
FIG. 3 illustrates still another embodiment of a fiber optic collimator having claddings and other supplementary elements not illustrated in FIGS. 1 or 2.

Referring now to FIGS. 1, 2, and 3 there is shown a cross section of one of a pair of fiber optic Liouville non-imaging connectors. An input fiber optic 10 feeds an entry port 11 having substantially the same diameter $d_1$ as the input optical fiber. The connector has an axial rotational symmetry formed by rotating the connector profile around the axis of symmetry to form a cone like structure having an curved wall structure 12 terminating at an expanded area 13 and having an exit diameter $d_2$ substantially larger then the entry diameter $d_1$ as at 11.

The function of a coupler connector is to transmit a light beam from one fiber to the other by using the so-called expanded beam approach. It is usually easier to obtain high coupling efficiency when the connection area as at 13 is larger than the fiber cross-section area as at 11. A typical connection area denoted by $d_2$ in FIG. 1 and FIG. 2, is of 1 to 2 mm while the typical multimode fiber core diameter, denoted by $d_1$ in FIG. 1 and FIG. 2, is of 0.1 to 0.2 mm. Using the expanded-beam approach results in a connection area 13 that is less sensitive, for example, to external contamination.

In general, beam-expanded connector systems are highly sensitive to angular misalignment. The non-imaging connector which is the subject matter of the present invention has a higher tolerance to angular misalignment than prior art systems based on imaging optics.

The present disclosure deals with developing the contours of side walls 12 which can be either convex 12 as shown in FIG. 1 or concave 18 as shown in FIG. 2 or combinations of both types for fiber optic connector applications. The side wall can contain a partial straight-line (linear) part however the side wall is never fully linear. The physical structure of the side wall contour is always a reflective optical interface, that is, the boundary of two different optical materials. There are in general, four kinds of optical boundaries: metal-air, metal-dielectric, air-dielectric and dielectric-dielectric. The boundaries illustrated in FIG. 1, FIG. 2, FIG. 3 and FIG. 4 are air-dielectric 12, air-dielectric 18, dielectric-dielectric 24, and metal-air 23.

Figure 4:
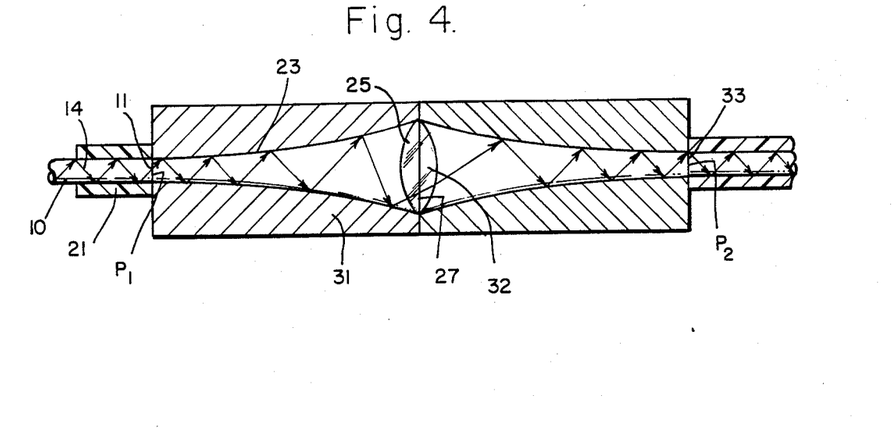
FIG. 4 illustrates a complete connector comprising a collimator part and a concentrator part using metallic LNIO elements with lenses and designed to be radiation resistant.
Figure 5:
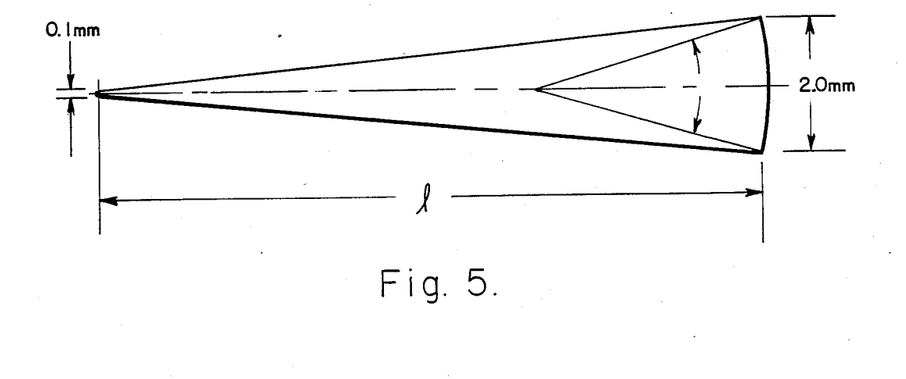
FIG. 5 illustrates an exemplary design of a non-imaging collimator part comprising one part of the connector.
Figure 6:
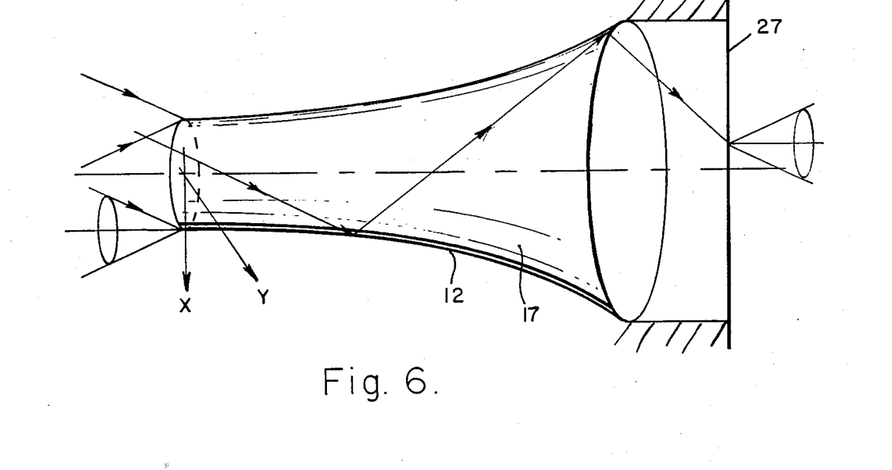
FIG. 6 illustrates a three dimensional angular spectrum of light for collimating part of a non-imaging connector.
Figure 7:
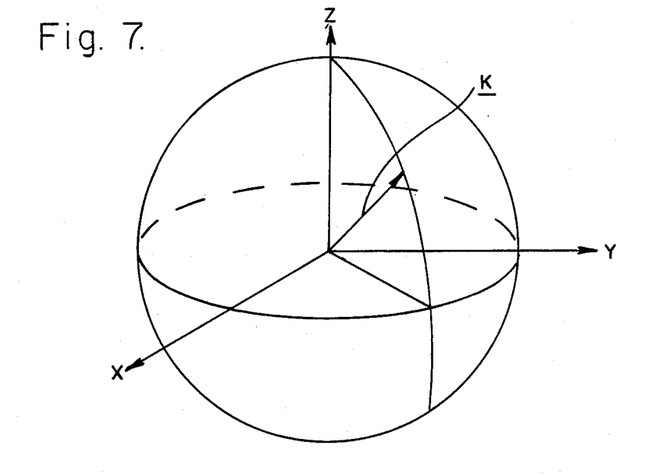
FIG. 7 illustrates the coordinate system for a light wave-vector K.

The present disclosure deals also with developing the contours of the front or exit surface which can be either straight-line 13 as in FIG. 1, convex 22 as in FIG. 2, or concave 25 as in FIG. 4. The physical structure of the front surface contour is always a refractive optical interface either dielectric-air 22, 26, or dielectric-dielectric 25. In the particular limited case, the front surface boundaries of two twin parts coincide within plane of symmetry 27 as in FIG. 4.

Referring now to FIG. 1, there is shown the simplest version of the disclosed coupler where the optical part 17 is a dielectric compound parabolic concentrator (DCPC), having axial-rotational symmetry as in Winston's U.S. Pat. No. 4,114,592. The exemplary light ray 14 is guided through the input fiber core 10 with total internal reflection (TIR) 28 on the fiber core-cladding interface 29. It enters the DCPC dielectric medium 17 with an incident angle $\theta_1$. The entry 11 is an optical interface not necessarily flat as in FIG. 1. The dielectric media of fiber core 10 and DCPC 17 do not need to have the same refractive indices. Here, in FIG. 1, for simplicity, they have the same refractive index n. The said ray propagates in DCPC medium 17 in straight-line segments, with TIR 20 at interface 12, in order to approach exit 13 The average number of reflections is not significantly larger than one.

In FIG. 1 only a collimator part of the disclosed device is, for simplicity, illustrated. The entire disclosed connector consists of two identical parts. The entry 13 is also the symmetry plane of the connector. For easier explanation of the principle, the disclosed connector is cut-off exactly at the plane of symmetry. In such a case, the ray would enter the air with exit angle $\theta_2$, as an exemplary exit 13. It is well-known from the literature cited that the two dimensional (2D) version of the Compound Parabolic Concentrator (DCPC) system is an ideal system for considering the Liouville theorem. It is possible for the optical efficiency of the 2D DCPC system to reach precisely a 100%-theoretical concentration limit. This means that in the optimum 2D geometry described below, all entering 2D entry rays of DCPC will approach the 2D exit of DCPC and then pass through the concentrator part of the connector. This system is defined as an ideal expanded beam fiber optic 20 concentrator.

Considering 2D entry sizes as $d_1$ and the maximum entry angle of incident rays as $\theta_{1max}$ and considering 2D exit sizes as $d_2$ and the maximum exit angle, in air, as $\theta_{2max}$ and assuming the ideally transparent DCPC medium and the TIR for all rays at the DCPC interface, then, according to the cited literature, the following relation will satisfy the Liouville theorem:

$$d_1 \, n \, \sin(\theta_{1max}) = d_2 \sin(\theta_{2max}) \quad (1)$$

The Liouville theorem indicates that in the ideal case all light rays, within boundaries determined by Equation (1), coming from the entry will approach the exit.

The 2D fiber optic connector constructed from two identical DCPCs that satisfy the above conditions and will have exactly 100% optical efficiency. The 3D axially symmetrical version, which is the subject of this invention and illustrated in FIG. 1, is not usually an ideal system, due to skew rays which are not always accepted by the system.

There is a fundamental difference between the concentrator non-imaging optics as taught by the prior art (see the Book) and the connector non-imaging optics as described in the present patent application.

For example in the prior art the incident beam entering the expanded part of the concentrator is usually represented as a direct solar component having a uniform spectral cross-section and uniformly distributed rays within the boundaries as set forth by Equation (1). Winston proves in Appendix B of the Book that assuming the constraints as set forth in equation (1), it is impossible to design an ideal non-imaging concentrator with axial symmetry.

In the connector case, however, the incident concentrator beam is at the same time the output collimator beam and as such is not at all similar to the collimated solar energy beam as described in the Book. In other words the theorem as set forth in Appendix B of the Book does not hold for the present invention where it can be shown that the incident concentrator beam will be fully accepted only if it has angular symmetry identical to that of the output collimator beam reversed in time. According to the Liouville theorem, there is only one such beam. The above explanation is the essence of the time-reversal principle which is fundamental to the non-imaging connector which is the subject of the present invention.

The optical efficiency of the disclosed non-imaging connector can be greater than 95%, and can even be very close to 100% depending on the particular construction of the disclosed device as illustrated in FIG. 2, FIG. 3 and FIG. 4.

The particular construction of the disclosed device is a trade-off between optical efficiency and other figures of merit such as, for example, compactness, connector length, ruggedization, and radiation hardness and tolerance to angular misalignment.

Referring now to FIG. 2 there is shown a shorter connector using a lens-type front surface 22 which can be a spherical surface. In order to maximize the overall optical efficiency, however, this surface should be aspheric. The side wall contour 18 has a rather sophisticated profile defined as a partially curved shape which is usually a composition of quasi-parabolic, quasi-hyperbolic and quasi-linear and which is determined by sophisticated mathematical procedures to obtain a high optical efficiency. There is no single one optimum procedure for determining the optimum shape, since it depends on the type of constraints imposed on the system design.

In FIG. 3, the structure of FIG. 2 has been augmented to reflect real world applications by housing construction including fiber cladding 21, connector cladding 28 and radiation-protective coating 29. The central part of the system includes a metallic mirror 30 for increasing the connector optical efficiency.

In FIG. 4, another embodiment of the disclosed device is presented with an air-metal reflective interface 23 and a plano-convex dielectric lens 32. In this case, the refractive interface is an air-dielectric 25 and the central part of the system is reduced to the plane of symmetry 27. In FIG. 4, contrary to FIG. 1, FIG. 2 and FIG. 3, where the light-reflection mechanism is the TIR-type, the light reflection is from a metallic mirror surface 23, and the connector housing 31 is metallic or other material suitable to be radiation hardened.

Figure 8A:
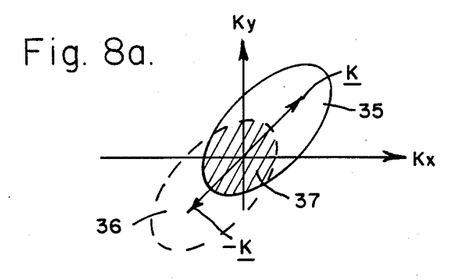
FIG. 8a, 8b and 8c illustrate locations of an exemplary angular spectrum in $(k_x, k_y)$ space for fixed point $(x,y)$.

The second part of the connector is called a concentrator and is identical to the first collimating part. According to the time-reversal principle, the light rays having horizontal wave vector components located at the overlapping area 37, will reach the output fiber. Therefore, the size of overlapping area 37, illustrated in FIG. 8a, determines the optical efficiency of the system. The relationship can therefore be shown in the form:

$$OE(x,y) = \int\int W \overline{W} \, dk_x dk_y \qquad (2)$$

Also, the remaining non-overlapping area can be shown to be:

$$\begin{aligned} \Delta E(x,y) &= \int\int (W - W\overline{W}) \, dk_x \, dk_y \\ &= \int\int W(1 - \overline{W}) \, dk_x \, dk_y \end{aligned} \qquad (3)$$

and, $\Delta E = E - OE$, where $$E(x,y) = \int\int W(k_x,k_y;x,y) dk_x dk_y \qquad (4)$$

Equation (4) is the emittance function, well known in radiometry, and the phase density function W can be shown to be:

$$W = W(k_x,k_y;x,y) = \begin{cases} 1, \text{for } k \text{ belonging to } H \\ 0, \text{otherwise} \end{cases} \qquad (5)$$

where, for simplicity, the Lambertian source model has been assumed. On the other hand, the inverse density function $\overline{W}$ can be shown to be:

$$\overline{W}(k_x,k_y;x,y) \begin{cases} 1, \text{ for } k \text{ belonging to } \overline{H} \\ 0, \text{otherwise} \end{cases} \qquad (6)$$

where: $k = (k_x, k_y)$ is a horizontal (x,y) projection of the wave vector K, and where:

$$K = w\, n/c$$

where;
  w is angular frequency.
  n is refractive index of a medium, and
  c is light velocity in a vacuum.

The inverse $\overline{H}$ area is defined in such a manner that k-vector belongs to $\overline{H}$ if and only if $(-k)$ inverse vector belongs to H.

Assuming the 100%-optical efficiency of the collimating part of the system, the total input power, $P_1$, can be shown as follows:

$$P_1 = \int\int E(x,y) dk_x dk_y \qquad (7)$$

The output power, $P_2$ of the second fiber can be shown to be:

$$P_2 = \int\int OE(x,y) dx dy \qquad (8)$$

Thus, the optical efficiency of the system, is as follows:

$$S = \frac{P_2}{P_1} \qquad (9)$$

Finally, the optimization condition contour can be expressed by the following equation:

$$\begin{aligned} \Delta P &= P_1 - P_2 \\ &= \int\int \Delta E(x,y) \, dxdy \\ &= L_o \\ &= \text{minimum} \end{aligned} \qquad (10)$$

Figure 8B:
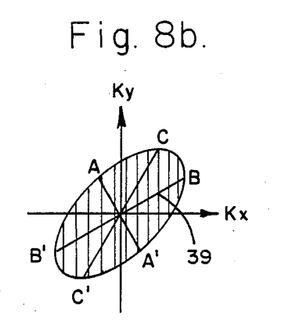
Figure 8C:
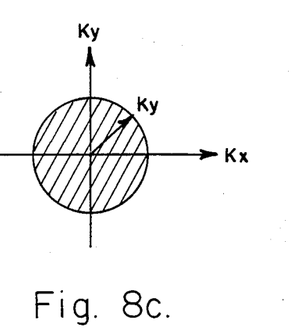

In order to minimize the optical losses $L_o$, we design the side-wall profile 12 and the front surface 22 in such a manner that the integral (10) is minimal. Thus, the H-areas 35 should be close to the inversion-invariant, that is, the H area 35 and the inverse area $\overline{H}$ 36 should nearly coincide. In the best case, the side wall should have either the circular form of the shape 38 as in FIG. 8c or, more generally, of the shape of inversion symmetry 39 where any points lying on the boundary, say A, B, C have inverse equivalents expressed as A',B' and C' in FIG. 8b. We refer to this rule as the inverse rule of the non-imaging connector optimization based on the Liouville theorem and time-reversal principle.

The inverse rule formulates the general principle, valid for any kind of expanded beam connector including non-imaging systems as well as imaging systems assuming both collimating and concentrating parts of the system are identical. The rule also applies in the case of a lossy collimating part in that the input power $P_1$ determines the collimator output optical power passing the symmetry plane of the connector system.

A number of mathematical procedures can be proposed in order to minimize the optical losses as determined by the functional integral (10). The choice of the particular method used depends on the number and kind of constraints assumed for the coupling system. For example, we can fix the fiber diameter $d_1$ and its numerical aperture, as well as the expanded diameter $d_2$, the lens radius R and thus its full arc angle. We can also assume, for a fixed dielectric medium refractive index n, the TIR for all rays, as a necessary condition. Then, by approximating the side-wall profile by suitable polynomial expressions and using the general ray tracing program for this type of non-imaging system, it is possible to optimize the polynomial coefficients by minimizing the functional integral (10).

Other methods can be used by starting with the trial solution satisfying the phase conservation principle for the edge rays and then using optimization procedures analogous to the first exemplary method.

All methods have in common the optimization architecture based on the inverse rule determined by Equation (10).

Figure 9:
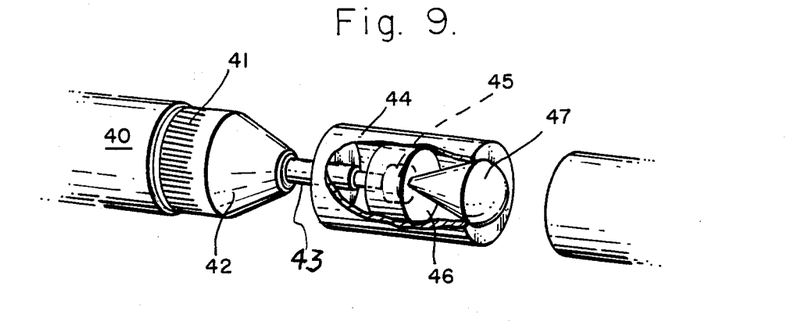
FIG. 9 illustrates an example of packaging a fiber optic non-imaging connector.
Figure 10:
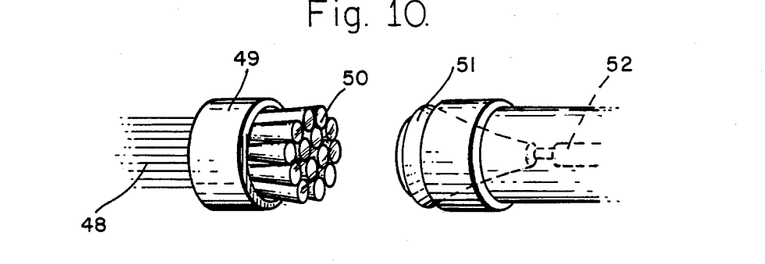
FIG. 10 illustrates a high density multi-port connector having a single fiber channel being split into many field connectors all based on the non-imaging optics principle.
Figure 11:
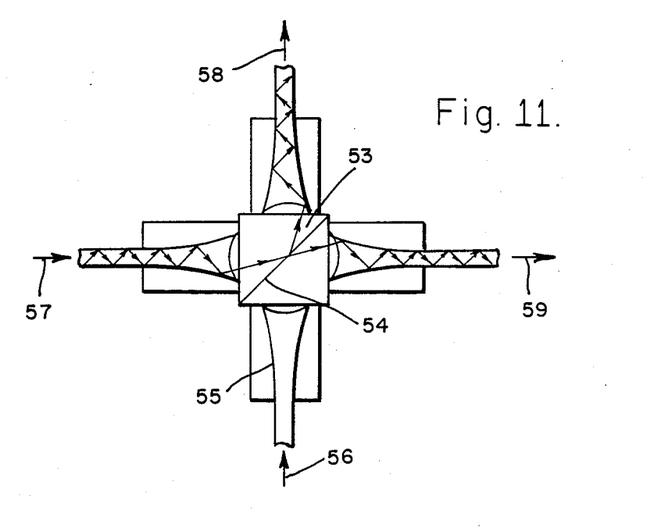
FIG. 11 illustrates a four-port directional coupler using a cubic beam splitter and four LNIO connectors.

FIG. 9, FIG. 10 and FIG. 11 show either the packaging approach or the higher-hierarchy systems based on Liouville non-imaging coupler connecter which is the subject of this patent, by referring to points numbered from 40 to 59.

In FIG. 9 there is shown an example of a packaging approach in the engineering of a non-imaging connector. The connector housing consists of a metal sleeve 40, a Kevlar reinforcing element 41, a strain relief fiber retainer 42 and a fiber buffer 43. The fiber buffer 43 is fed into a connector front body 44 and into a fiber optic alignment guide 45. The non-imaging connector is encapsulated in a dielectric cylinder 46 with the output surface indicated as 47. This embodiment can in turn be retrofitted into currently popular housing styles.

In FIG. 10 there is shown a high density multi-port connector having a single fiber channel being split into a plurality of individual connectors. FIG. 10 illustrates how a coupling can be efficiently coupled from a single channel 51 to a plurality of channels 50 to thereby couple optical fiber 52 with optical fibers 48.

In FIG. 11 there is shown a four port directional coupler for accessing fiber optics 56, 57, 58 and 59. The input beams 56 and 57 can be split into output channels 58 and 59 by means of a suitable half mirror 54 and a prism 53 together with using four non-imaging connectors 55.

The embodiments of the invention in which an exclusive property or privilege is claimed are defined as follows:

We claim:

1. A non-imaging expanded-beam fiber optic connector comprising:
   a collimator part and a concentrator part held together in a given relationship for accepting light rays from said collimator and passing said light rays unchanged through said concentrator,
   said collimator part and said concentrator part are identical each having partially curved side walls of predetermined shape, that shape being defined by Liouville's theorem and the time reversal principle, and a highly reflective internal surface for passing said light rays with a minimum of power loss.

2. A non-imaging fiber optic connector according to claim 1 in which said collimator part is connected at one end to a first optical fiber for feeding light rays to said collimator and said concentrator part is connected at one end to a second optical fiber for accepting concentrated light rays.

3. A non-imaging fiber optic connector comprising:
   a pair of identical coupling parts termed a collimator and a concentrator connected to each other for interconnecting external fiber optics together,
   said collimator expanding and collimating light rays received from a first external optical fiber,
   said concentrator accepting said expanded and collimated rays of light from said collimator and concentrating and feeding said rays of light to a second external optical fiber,
   said collimator and said concentrator having partially curved side walls defined by Liouville's theorem and the time reversal principle with internally reflective surfaces for minimizing the power loss in light energy entering the first external optical fiber and exiting the second external optical fiber.

4. A non-imaging expanded beam fiber optic connector for transmitting and coupling light energy from a first optical to a second optical fiber comprising:
   a connector having two identical parts and a plane of symmetry lying equidistant between the two identical parts,
   a first part for collimating and expanding a light beam propagated from a first input optical fiber to the plane of symmetry of the connector,
   a second concentrating part for collecting and concentrating said light beam from said plane of symmetry to a second input optical fiber.
   each of said parts having axial-rotational symmetry and containing an internally reflective side wall surface and a front refractive surface, and
   in which both of said surfaces having optimized profiles, said optimized profile surfaces being designed so that the angular spectrum of light wave vectors projected onto said plane of symmetry has inverse symmetric properties when taking an angular spectrum of wave-vector projections for a given pencil of rays crossing a given plant of said plane of symmetry when making an inverse angular spectrum to said angular spectrum and calculating overlapping portions of these spectra and then calculating the remaining non-overlapping part within said angular spectrum and integrating said non-overlapping parts over all points of said plane of symmetry within the side wall boundary, and
   in which the obtained quantity is minimized by optimizing said side wall profile and said front surface profile.

5. An expanded beam fiber optic connector according to claim 4 in which the front area of each of said identical parts of said connector is covered by a convergent dielectric lens.

6. An expanded beam fiber optic connector according to claim 5 in which each said dielectric lens has an optimized profile surface.

7. The device of claim 4 wherein said identical parts of said connector are filled with a dielectric medium and said reflective side wall is of a type of dielectric-dielectric interface in that total internal reflection condition is satisfied for rays passing through said connector.

8. The device of claim 7 wherein said front refractive surface has a spherical profile.

9. The device of claim 7 wherein said front refractive surface has an aspheric profile.

10. The device of claim 7 wherein said front refractive surface has a flat profile.

11. The device of claim 4 wherein both said identical parts of said connector are filled with a dielectric medium and said reflective side wall is of a type of dielectric-air interface, whereby the total internal reflection condition is satisfied for rays passing through the connector.

12. The device of claim 11 wherein said front refractive surface has a spherical profile.

13. The device of claim 11 wherein said front refractive surface has an aspheric profile.

14. The device of claim 11 wherein said front refractive surface has a flat profile.

15. The device of claim 4 wherein both said identical parts of said connector are filled with a dielectric medium and said reflective side wall has a dielectric-metal interface.

16. The device of claim 15 wherein said front refractive surface has a spherical profile.

17. The device of claim 15 wherein said front refractive surface has an aspheric profile.

18. The device of claim 15 wherein said front refractive surface has a flat profile.

19. The device of claim 4 wherein said reflective side walls are metallic.

20. The device of claim 19 wherein the front area of each of said identical parts of said connector is covered by a convergent dielectric lens.

21. The device of claim 19 wherein the front area of each said identical parts of said connector is covered by a divergent dielectric lens.

22. A high density multi-port non-imaging connector consisting of two separate parts according to claim 4 in which the first collimating part connected with the input optical fiber is identical in size with the concentrating part and the second concentrating part is a bundle of identical smaller non-imaging concentrators connected with output optical fibers.

23. A multi-port directional coupler comprising a conventional cubic beam splitter and including four identical non-imaging connectors as defined in claim 4 positioned in operative relationship to the beam splitter.

* * * * *

UNITED STATES PATENT AND TRADEMARK OFFICE
CERTIFICATE OF CORRECTION

PATENT NO. : 4,898,450

DATED : February 6, 1990

INVENTOR(S) : T. Jannson, J. Jannson and P. Yeung

It is certified that error appears in the above-identified patent and that said Letters Patent is hereby corrected as shown below:

Title page, item [75]: "Tommasz" should read --Tomasz--;

Column 3, line 52, after "13" insert a period;

Column 4, line 19, delete "and";

Column 8, line 26, "plant" should read --point--.

Signed and Sealed this

Nineteenth Day of March, 1991

Attest:

HARRY F. MANBECK. JR.

*Attesting Officer*     *Commissioner of Patents and Trademarks*